Figure 1:
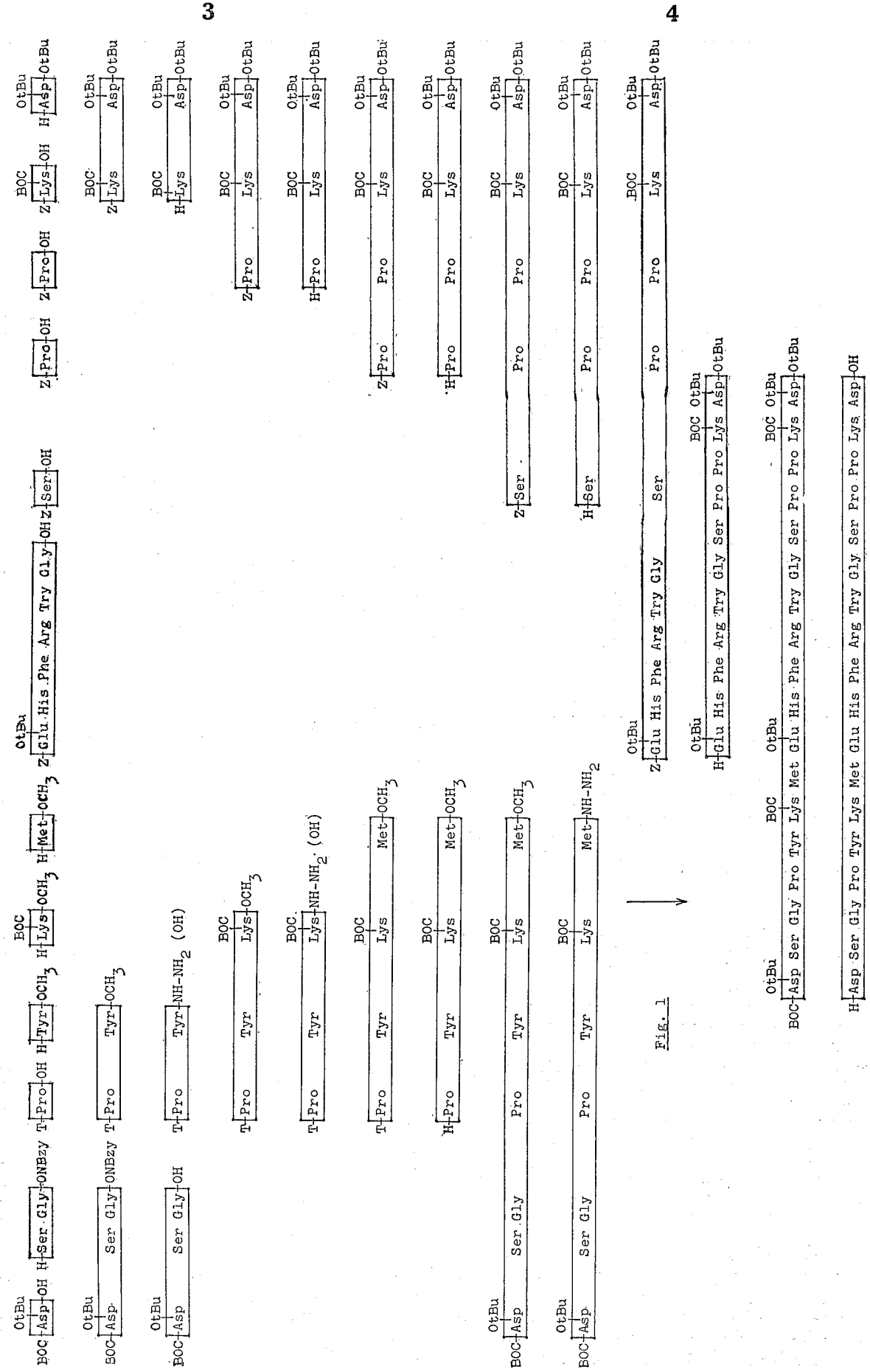

3,300,468
OCTADECAPEPTIDES AND INTERMEDIATES IN THE PREPARATION THEREOF
Robert Schwyzer and Beat Iselin, Riehen, Heini Kappeler, Bettingen, Bernhard Riniker, Reinach, Basel Land, and Werner Rittel, Basel, Switzerland, assignors to Ciba Corporation, New York, N.Y., a corporation of Delaware
No Drawing. Filed May 13, 1964, Ser. No. 367,189
Claims priority, application Switzerland, May 20, 1963, 6,279/63
4 Claims. (Cl. 260—112.5)

This invention provides a process for the manufacture of the hypophysis hormone β-MSH, which has not hitherto been obtained synthetically, and derivatives and salts thereof. The β-MSH of the cortex has the formula L-aspartyl-L-seryl-glycyl-L-prolyl-L-tyrosyl-L-lysyl-L - methionyl - L - glutamyl - L - histidyl - L - phenylalanyl - L - arginyl - L - tryptophyl - glycyl - L - seryl-L-prolyl-L-prolyl-L-lysyl-L-aspartic acid. Among the derivatives of this compound there are to be understood preferably functional derivatives, such a esters for example lower alkyl esters, e.g. methyl, ethyl, propyl, especially tertiary butyl ester, free and substituted benzyl ester, e.g. p-nitrobenzyl ester, p-halogenobenzyl ester, p-methoxybenzyl ester, p-phenylazo benzyl ester, unsubstituted amides and hydrazides, and especially amides which are formed by a replacement of one or more of the b- or γ-carboxylic groups of the aspartic or glutamic acid radical by the carbonamide group, and also compounds which contain amino protecting groups, for instance carbobenzoxy or substituted carbobenzoxy such as p-halogeno-carbobenzoxy, p-methoxy carbobenzoxy, p-phenylazobenzyloxy-carbonyl p-(p'-methoxy phenylazo)-benzyloxycarbonyl, trityl, and especially teritary butyloxy carbonyl. In U.S. specification Serial No. 26,956, filed May 5, 1960, now Patent No. 3,234,201 by Robert Schwyzer et al. is described an octadecapeptide corresponding to β-MSH, which contains instead of the first aspartic acid radical the asparagine radical. However, it has been subsequently found that this product was not obtained in the pure form as splitting of the protected groups used therein (tosyl, methyl ester) was accompanied by partial decomposition of the molecule.

The present invention is based on the observation that β-MSH is obtained in pure form and in good yield, by condensing the hexapeptide carbobenzoxy-γ-tert.-butyl-L - glutamyl - L - histidyl - L - phenylalanyl - L - arginyl-L-tryptophyl-glycine with the pentapeptide L-seryl-L-prolyl - L - prolyl - tertiary - butyloxycarbonyl - L - lysyl-L-aspartic acid di-tertiary butyl ester to form the protected undecapeptide ester, splitting off the carbobenzoxy group from the latter ester, condensing the resulting γ-tertiary - butyl - L - glutamyl - L - histidyl - L - phenylalanyl - L - arginyl - L - tryptophyl - glycyl - L - seryl-L - prolyl - L - prolyl - tertiary - butyloxycarbonyl - L-lysyl-L-aspartic acid di-tertiary-butyl ester with tertiary-butyl - oxycarbonyl - β - tertiary - butyl - L - aspartyl-L - seryl - glycyl - L - prolyl - L - tyrosyl - tertiary - butyloxycarbonyl-L-lysyl-L-methionine to form the protected octadecapeptide ester and splitting off the protecting groups, see FIG. 1. In this FIGURE BOC=tertiary-butyloxycarbonyl; Z=carbobenzoxy; T=trityl; tBu=tertiary-butyl and NBzy=p-nitrobenzyl.

The condensation of the hexapeptide with the pentapeptide to form the undecapeptide is advantageously carried out in the presence of toluene suphonic acid and a carbodiimide.

For the preparation of the amides, the β-tertiary-butyl-aspartic acid or γ-tertiary-butyl-glutamic acid radical is exchanged for the radical of asparagine or glutamine.

The hexapeptide derivative Z-Glu(OtBu)-His-Phe-Arg-Try-Gly-OH can be obtained by the process described in U.S. specification Serial No. 343,228, filed February 7, 1964, by Robert Schwyzer et al. The tripeptide derivative T-Pro-Tyr-Lys(BOC)-OCH$_3$ shown in FIG. 1 can be obtained by condensing Z-Pro-Tyr-OH with Lys(BOC)-OCH$_3$ to form Z-Pro-Tyr-Lys(BOC)-OCH$_3$, splitting off the carbobenzoxy group, and tritylating the tripeptide ester.

The process of the invention has been found to be very advantageous because a large number of intermediate products can be obtained in crystalline form.

The β-MSH obtained by the process has in vitro an activity of 2 to 3. $10^9$ units per gram, as is the case for natural β-MSH. It can therefore be used as a hormone instead of natural β-MSH. As compared with the latter it has the advantage that it is free from other hypophysis hormones and by-products. The octadecapeptide and its derivatives are also useful as intermediate products for the synthesis of peptides having longer amino acid chains.

Depending on the procedure used, the new compounds are obtained in the form of bases or salts thereof. From the salts the bases can be obtained by methods in themselves known. From the bases, salts can be made by reaction with acids suitable for making therapeutically useful salts, for example there may be used inorganic acids, such as hydrohalic acids, for example, hydrochloric acid or hydrobromic acid, perchloric acid, nitric acid or thiocyanic acid, sulfuric or phosphoric acids, or organic acids, such as formic acid, acetic acid, propionic acid, glycollic acid, lactic acid, acetic acid, propionic acid, glycollic acid, lactic acid, pyroracemic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-amino-benzoic acid, 4-hydroxy-benzoic acid, anthranilic acid, cinnamic acid, mandelic acid, salicylic acid, 4-aminosalicylic acid, 2-phenoxybenzoic acid, 2-acetoxybenzoic acid, methane sulfonic acid, ethane sulfonic acid, hydroxyethane sulfonic acid, benzene sulfonic acid, para-toluene sulfonic acid, naphthalene sulfonic acid or sulfanilic acid.

The octadecapeptide obtained by the process can be used in the form of pharmaceutical preparations. These preparations contain the peptide in admixture with a pharmaceutical, organic or inorganic carrier suitable for enteral or parenteral administation. As such carriers there are used substances that do not react with the polypeptide, for example, gelatine, lactose, glucose, pectine, sodium chloride, starch, magnesium stearate, talcum, vegetable oils, benzyl alcohols, gums, polyalkylene glycols, white petroleum jelly, cholesterol or other known carriers for medicaments. The pharmaceutical preparations may be made up in the form of tablets, dragees, powder, salves, creams, suppositories or in liquid form as solutions, suspensions or emulsions. If desired they may be sterilised and/or may contain auxiliary substances such as preserving, stabilising, wetting or emulsifying agents. They may also contain other therapeutically valuable substances.

The following example illustrates the invention.

In chromatography the following systems were used:

No. 42=n-propanol-ethyl acetate-water, 7:1:2
No. 43=tertiary - amyl alcohol - isopropanol - water, 100:40:55
No. 49=sec.-butanol-isopropanol-triethylamine - diethylbarbituric acid-water, 100:10:0.2:1.8 g.:60
No. 52=n-butanol-acetic acid-water, 100:10:30
No. 54=sec.-butanol-isoproponal-monochloracetic acid-water, 70:10:3 g.:40
No. 56=sec.-butanol-isopropanol-sodium salt of diethylbarbituric acid-water, 100:15:0.5 g.:60
No. 87=isopropanol-formic acid (98% strength)-water, 20:1:5
No. 101=n-butanol-pyridine-glacial acetic acid-water, 30:20:6:24.

Paper chromatography was carried out by the descending method on Whatman No. 3 paper, and thin layer chromatography on silica gel (Merck). Coloration with Reindel-Hoppe reagent, ninhydrin (after splitting off the BOC or trityl groups by treating the thin layer chromatograms with a solution of hydrogen chloride in ethyl acetate) and, in the presence of tyrosine, with Pauly reagents.

EXAMPLE 1

(1) Tertiary-butyloxycarbonyl-L-aspartic acid - $\beta$ - tertiary-butyl-ester were dissolved in 25 ml. of a 2-molar solution of sodium hydroxide, and a solution of 8.6 grams (60 mmol) of tertiary-butyloxycarbonylazide in 25 ml. of methanol was added. Then 7.7 ml. (55 mmol) of triethylamine in 30 ml. of methanol were added dropwise in the course of one hour while stirring at 40° C. After stirring for a further two hours at 40° C. and allowing the mixture to stand overnight at 20° C., the solution was given a pH value of 7 by the addition of 2 N-hydrochloric acid and the mixture was freed from methanol in vacuo at a temperature not exceeding 30° C. The aqueous solution was covered with ether and acidified at 0° C., while shaking, with 100 ml. of 1 N-hydrochloric acid. The ether phase was rapidly separated, washed several times with saturated sodium chloride solution, dried and evaporated in vacuo. The residue so obtained crystallised slowly at 0° C. after inoculation, and, after trituration with petroleum ether, yielded 12.9 grams (89%) of the crude product melting at 59–63° C.; after recrystallisation from petroleum ether it gave 10.0 grams (69%) of felted needles melting at 63–66° C.; $[\alpha]_D^{25}=+1.7°\pm0.5°$ (c.=1.9 in methanol); unitary in the thin layer chromatogram, $Rf_{43}=0.47$; $Rf_{101}=0.74$.

For preparing crystals for inoculation the compound was purified by way of its dicyclohexyl-ammonium salt: 2.6 grams (9 mmol) of the crude product was dissolved in 15 ml. of ether and 2.1 ml. (10 mmol) of dicyclohexylamine were added. Upon standing, there slowly precipitated from the solution a solid product which was isolated after several hours; 3.65 grams of the product were obtained having a melting point of 142–144° C.; after recrystallisation from acetonitrile, 3.24 grams (77%) were obtained melting at 145–147° C.; $[\alpha]_D^{25}=+12.7°\pm0.5°$ (c.=2.8 in methanol).

For converting the product into the free acid 2.35 grams (5 mmol) of the dicyclohexyl-ammonium salt in 50 ml. of ethanol of 50% strength were agitated with 5 ml. of Dowex 50 X–8 for 15 minutes, and the mixture was filtered, evaporated and dried in vacuo. The residue, when triturated with a small amount of petroleum ether, gave 1.28 grams (89% of crystalline product) melting at 64–67° C.

(2) *Tertiary - butyloxycarbonyl - $\beta$ - tert. - butyl - L-aspartyl-L-seryl-glycine p-nitrobenzyl ester.*—10 grams (35 mmol) of tert.-butyloxycarbonyl-L-aspartic acid $\beta$-tert.-butyl ester and 10.4 grams (35 mmol) of L-serylglycine-para-nitrobenzyl ester (freshly prepared from its hydrobromide) were dissolved in 200 ml. of acetonitrile, and, while stirring at −5° C., a pre-cooled solution of 7.8 grams (38 mmol) of dicyclohexylcarbodiimide in 50 ml. of acetonitrile was added. After stirring for a further 30 minutes at −5° C. and overnight at 0° C., 1 ml. of glacial acetic acid was added, and the mixture was filtered to remove the precipitated dicyclohexylurea. The filtrate was evaporated in vacuo, the residue taken up in ethyl acetate, and the solution was washed at 0° C. in 1 N-hydrochloric acid, a 1 N-solution of sodium bicarbonate and a saturated solution of sodium chloride, then dried and evaporated in vacuo.

The residue, after being stirred with ether several times, gave 14.2 grams of a crystalline product melting at 124–128° C. By recrystallisation from ethyl acetate, there were obtained needles melting at 131–133° C.; $[\alpha]_D^{25}=-15.8°\pm0.5°$ (c.=2.0 in methanol). UV.-absorption: $\lambda_{max}$ 267 m$\mu$, $\epsilon$=9600 (in fine spirit); unitary in the thin layer chromatogram; $Rf_{43}=0.76$; $Rf$ in benzene-acetone 1:1=0.45.

(3) *Tert. - butyloxycarbonyl - $\beta$ - tert. - butyl - L-aspartyl-L-seryl-glycine.*—5.7 grams (10 mmol) of tert.-butyloxycarbonyl - $\beta$ - tert. - butyl - L - aspartyl - L-seryl-glycine p-nitrobenzyl ester were dissolved in 100 ml. of methanol, and hydrogenated in the presence of 1 gram of palladium-carbon (10%) at room temperature under atmospheric pressure, the carbon dioxide formed being absorbed in sodium hydroxide solution. When a little more than 4 equivalents of hydrogen had been absorbed, the hydrogenation ceased. After filtering the solution to remove the catalyst the solution was evaporated in vacuo to a syrup, the residue was taken up in ethyl acetate, and the solution was extracted at 0° C. three times on each occasion with 10 ml. of a 1 N-solution of potassium bicarbonate. The combined alkaline extracts were covered with 150 ml. of ethyl acetate, and at 0° C. 10 ml. of 5 N-hydrochloric acid were added dropwise, while shaking. The ethyl acetate phase was rapidly separated, the aqueous phase was extracted twice more with cold ethyl acetate and the combined ethyl acetate solutions were washed immediately twice with a small amount of a saturated solution of sodium chloride, then dried and concentrated in vacuo to about 10 ml.; after the addition of petroleum ether at 50° C., the reaction product crystallised, while cooling slowly, in the form of felted needles.

4.0 grams (92%) of a product melting at 132–134° C. were obtained. The melting point did not change after recrystallisation from a mixture of ethyl acetate and hexane; $[\alpha]_D^{25}=-16.9°\pm0.5°$ (c.=1.9 in methanol), $-13.4°\pm0.5°$ (c.=2.0 in glacial acetic acid); unitary in the thin layer chromatogram: $Rf_{43}=0.32$; $Rf_{101}=0.65$.

By splitting the product with trifluoroacetic acid (5 mg. of substance in 0.1 ml. of reagent for one hour at 25° C., then evaporated, and the residue triturated with ether) there was obtained the chromatographically unitary tripeptide Asp-Ser-Gly-OH; in the thin layer chromatogram Rƒ 0.20 in system 101; in the paper chromatogram $Rf_{49}=0.13$; $Rf_{54}=0.33$; $Rf_{87}=0.23$.

(4) *Trityl-L-proline benzyl ester.*—A solution of 97 grams (0.4 mol) of L-proline-benzyl ester hydrochloride in 800 ml. of chloroform was mixed, while stirring at 0° C., with 125 ml. (0.88 mol) of triethylamine. Then at the same temperature a solution of 123 grams (0.44 mol) of trityl chloride in 1.2 liters of chloroform was added dropwise in the course of two hours. After being allowed to stand overnight at 25° C., the solution was washed, while cooling with ice, with a 1 N-solution of citric acid, a 1 N-solution of sodium bicarbonate and water, then dried, evaporated, and the residue was crystallised from ether. 136 grams (76%) of a product melting at 117–119° C. were obtained. By recrystallisation from a mixture of ether and petroleum ether, there were obtained 124 grams of the product melting at 118–119° C.; $[\alpha]_D^{25}=-67.9° \pm 0.5°$ (c.=2.0 in chloroform).

(5) *Trityl-L-proline.*—135 grams (0.3 mol) of trityl-L-proline benzyl ester were dissolved in 800 ml. of ethyl acetate, and hydrogenated in the presence of 10 grams of palladium black at room temperature under atmospheric pressure. When 8 liters of hydrogen had been taken up in the course of seven hours, the hydrogenation was discontinued. The solution was filtered to remove the catalyst and precipitated L-proline, the solution was concentrated in vacuo to about 100 ml., then inoculated (inoculation crystals from ether) and the precipitated crystalline product was isolated after 30 minutes. There were obtained 44.6 grams (42%) of a product which melted at about 165° C., then solidified and melted again at 218–220° C. From the mother liquor there were obtained by concentration a further 8.2 grams of substance having the same degree of purity; in the thin layer amide and methanol, 39 grams of the product melting at chromatogram $Rf_{43}=0.67$ (about 5% L-proline, $$Rf_{43}=0.09).$$

(6) *Trityl-L - prolyl-L - tyrosine methyl ester.*—90 grams (0.25 mol) of crude trityl-L-proline and 49 grams (0.25 mol) of L-tyrosine methyl ester were dissolved with slight heating in 1.5 liters of acetonitrile, and 58 grams (0.28 mol) of dichyclohexyl-carbodiimide were added at −5° C. while stirring. The whole was stirred for a further 30 minutes at 0° C. and overnight at room temperature and then 2 ml. of glacial acetic acid were added to destroy the excess of carbodiimide. The precipitated mixture of dicyclohexyl-urea and dipeptide derivative was filtered off, washed with acetonitrile, and stirred with 500 ml. of dimethylformamide. After filtering off the insoluble dicyclohexyl-urea, the filtrate was concentrated in vacuo to about 200 ml. and 1 liter of methanol was added. After allowing the mixture to stand overnight at 0° C., the precipitated crystalline dipeptide derivative was isolated. There were obtained 47.5 grams (35%) of a product melting at 222–224° C. After recrystallisation from a mixture of dimethylformamide 226–228° C. were obtained; $[\alpha]_D^{25}=85.2° \pm 0.5°$ (c.=2 in dimethylformamide); in the thin layer chromatogram $Rf_{43}=0.77$, $Rf=0.76$ in benzene-acetone (1:1).

(7)(a) *Trityl-L-prolyl-L-tyrosine hydrazide.*—A solution of 0.8 gram (1.5 mmol) of trityl-L-prolyl-L-tyrosine methyl ester in 4 ml. of dimethylformamide was mixed with 0.75 ml. (15 mmol) of hydrazine hydrate, the mixture was allowed to stand for 24 hours at room temperature, and then 10 ml. of water were slowly added at 0° C. The initially oily precipitated hydrazide crystallized upon trituration, and it was separated by centrifuging and washed well with water. There was obtained 0.78 gram of the product melting at 216–218° C. (with decomposition). For further purification the crude product was recrystallized from a large amount of hot methanol to yield 0.67 gram (84%) of the product melting at 217–219° C.; $[\alpha]_D^{25}=-77.0° \pm 0.5°$ (c.=2.0 in dimethylformamide); unitary in the thin layer chromatogram $Rf_{43}=0.71$.

(b) *Trityl-L-prolyl-L-tyrosine.*—40 grams (75 mmol) of trityl-L-prolyl-L-tyrosine methyl ester were suspended in 400 ml. of methanol, and 120 ml. of a 2 N-solution of sodium hydroxide were added, while stirring, the reaction temperature being maintained at 20° C. by slight cooling. The starting material dissolved in the course of about 30 minutes. After a further 30 minutes the mixture was diluted with 100 ml. of water, the methanol was distilled off in vacuo, and the aqueous solution was extracted with a small amount of ethyl acetate, acidified at 0° C. with 1 N-citric acid, and the precipitated product was extracted with a large amount of ethyl acetate. The ethyl acetate extracts were washed with 1 N-citric acid a saturated solution of sodium chloride, then dried, and evaporated in vacuo. By triturating the solid radical with a small amount of methanol there were obtained 34.7 grams (88%) of a crystalline product melting at 163–166° C. (with decomposition). After recrystallisation from methanol the product melted at 169–171° C.; $[\alpha]_D^{25}=-76.7° \pm 0.5°$ (c.=2.0 in dimethylformamide).

During recrystallisation from methanol, the trityl residue partially split off.

Upon recrystallisation from a mixture of tetrahydrofuran and ether (1:1) there was obtained an adduct with 1 mol of tetrahydrofuran, the product melted at 157–161° C. (with decomposition); $Rf_{43}=0.48$. Upon recrystallisation from acetone an adduct with 1 mol of acetone was obtained melting at 172–175° C. By recrystallisation from a mixture of dimethylformamide and ether an adduct with 1 to 2 mols of dimethylformamide melting at 132–134° C. was obtained.

(8) *Trityl-L-prolyl-L-tyrosyl-$N^\epsilon$-tert.-butyloxycarbonyl-L-lysine methyl ester.* (a) *According to the azide method.*—A solution of 535 mg. (1 mmol) of trityl-L-prolyl-L-tyrosine hydrazide in 7.5 ml. of dimethylformamide was mixed, while stirring, at −15° C. with 2 ml. of 2 N-hydrochloric acid and then 0.22 ml. of a 5 N-aqueous solution of sodium nitrite. After stirring the mixture for a further 5 minutes at −10° C., the excess of nitrite was decomposed by the addition of a solution of 60 mg. of ammonium sulfamate in 0.3 ml. of water, and the reaction solution was introduced dropwise into 30 ml. of ice water while stirring. The azide, which precipitated in solid form, was filtered off, washed with ice water, then dissolved in 30 ml. of dimethylformamide, and the solution was dried for a short time at 0° C. over magnesium sulfate. After the addition of 0.26 gram (1 mmol) of $N^\epsilon$-tert.-butyloxycarbonyl-L-lysine methyl ester in 2 ml. of dimethylformamide, the reaction solution was allowed to stand for 24 hours at 0° C., and was then evaporated at a temperature not exceeding 35° C. under 0.1 mm. pressure of mercury, the oily residue was taken up in ethyl acetate, the solution was washed at 0° C. with 1 N-citric acid, and 0.1 N-solution of sodium hydroxide, and water, and then evaporated in vacuo. The residue was triturated with ether to yield 510 grams of a solid product melting at 178–184° C. By recrystallisation from methanol there were obtained 360 mg. of the product melting at 204–206° C.; $[\alpha]_D^{25}=-66.8° \pm 0.5°$ (c.=1.9 in dimethylformamide); unitary in the thin layer chromatogram: $Rf_{43}=0.81$, $Rf=0.62$ in ethyl acetate, $Rf=0.74$ in a mixture of benzene and acetone (1:1), $Rf=0.39$ in a mixture of benzene and methanol (9:1).

(b) *According to the carbodiimide method.*—29.6 grams (50 mmol) of trityl-L-prolyl-L-tyrosine (tetrahydrofuran-adduct) and 13 grams (50 mmol) of $N^\epsilon$-tert.-butyloxycarbonyl-L-lysine methyl ester were dissolved, while stirring, in a mixture of 250 ml. of acetonitrile and 100 ml. of dimethylformamide, and 11.5 grams (55 mmol) of dicyclohexyl-carbodiimide were added at −5° C. After stirring for a further hour at −5° C. and overnight at 0° C., and then adding 0.5 ml. of glacial acetic acid, the precipitated dicyclohexyl-urea was filtered off and the filtrate was evaporated under 0.1 mm. pressure of mercury. The residue was taken up in ethyl acetate, the solution was washed as indicated under (a) above, dried, evaporated in vacuo and the crystalline residue was triturated with ether. 32.1 grams of a product melting at 188–192° C. were obtained. After recrystallisation from methanol 27.6 grams melting at 203–205° C. were obtained. The optical rotation and thin layer chromatogram were identical with the values given under (a) above.

(c) *Starting form Z-Pro-Tyr-Lys(BOC)-OCH₃*.—14.5 grams (35 mmol) of carbobenzoxy-L-prolyl-L-tyrosine and 9.1 grams (35 mmol) of tert.-butyloxycarbonyl-L-lysine methyl ester were dissolved in 500 ml. of acetonitrile, 7.8 grams (38 mmol) of dicyclohexyl-carbodiimide were added at −5° C., and the mixture was allowed to stand overnight at 0° C. After the addition of 1 ml. of glacial acetic acid, the precipitated dicyclohexyl-urea (7.6 grams=89%) was filtered off, the filtrate was evaporated in vacuo, the residue was dissolved in 500 ml. of ethyl acetate, and the solution was washed at 0° C. with 1 N-hydrochloric acid, a 1 N-solution of sodium bicarbonate and water, dried and evaporated to about 150 ml. The initially gelatinous precipitated reaction product was triturated with ether until solid. There were obtained 18.7 grams (82%) of amorphous carbobenzoxy-L-prolyl-L-tyrosyl - $N^\epsilon$-tert.-butyloxycarbonyl-L-lysine methyl ester melting at about 95° C. After reprecipitation from ethyl acetate, 15.8 grams of the product melting at 105–108° C. (sintering at about 100° C.) were obtained;

$$[\alpha]_D^{25} = -51.5° \pm 0.3°$$

(c.=4.0 in ethanol).

9.8 grams (15 mmol) of carbobenzoxy-L-prolyl-L-tyrosyl-$N^\epsilon$-tert.-butyloxycarbonyl-L-lysine methyl ester were dissolved in 150 ml. of methanol, and hydrogenated in the presence of 1.5 grams of palladium-carbon (10%) at room temperature and under atmospheric pressure. When the calculated quantity of hydrogen had been absorbed in the course of about 1 hour, the catalyst was removed by filtration, the filtered solution was evaporated in vacuo, and the residue was triturated with ether to form a powder. There were obtained 7.2 grams (92%) of the product melting at about 95–100° C. It was unitary in the paper chromatogram; $Rf_{54}=0.88$; $Rf_{56}=0.83$. The L - prolyl - L-tyrosyl-$N^\epsilon$-tert.-butyloxycarbonyl-L-lysine methyl ester crystallised from ethyl acetate $$[\alpha]_D^{25} = -16.4° \pm 0.9°$$

(c.=1.9 in ethanol).

A solution of 7.2 grams (14 mmol) of L-prolyl-L-tyrosyl-$N^\epsilon$-tert.-butyloxycarbonyl-L-lysine methyl ester in 60 ml. of chloroform was mixed with 2 ml. (14 mmol) of triethylamine. While stirring at 0° C., a solution of 4 grams (14 mmol) of very pure trityl chloride in 60 ml. of chloroform was added dropwise in the course of 30 minutes. After being allowed to stand for 1 hour at 0° C. and overnight at room temperature, the reaction solution was washed, while cooling with ice, with 1 N-citric acid, a 1 N-solution of sodium bicarbonate and water, then dried, and evaporated in vacuo. The oily residue, after being taken up in ether, inoculated and standing for a long time at 0° C., yielded 4.7 grams of crystalline trityl - L-prolyl-L-tyrosyl-$N^\epsilon$-tert.-butyloxycarbonyl-L-lysine methyl ester melting at 190–193° C. After recrystallisation from methanol it melted at 204–206° C. It was identical with the products obtained as described under (a) and (b) above.

(9) (a) *Trityl-L-prolyl-L-tyrosyl-$N^\epsilon$-tert.-butyloxycarbonyl-L-lysine hydrazide*.—A suspension of 0.76 gram (1 mmol) of trityl-L-prolyl-L-tyrosyl-$N^\epsilon$-tert.-butyloxycarbonyl-L-lysine methyl ester in 15 ml. of methanol was mixed with 1.5 ml. of hydrazine hydrate, and the mixture was heated under reflux until dissolution was complete (about 30 minutes). The solution was allowed to stand overnight, then evaporated in vacuo, the residue was triturated several times with water to remove the excess of hydrazine, and the dry amorphous product (0.73 gram) was dissolved in 10 ml. of ethyl acetate. On being left standing for several hours, the hydrazide separated out in crystalline form. There were obtained 0.53 gram (70%) of a product melting at 142–150° C. (sintering at about 130° C.). In the thin layer chromatogram $Rf_{43}=0.79$, $Rf=0.08$ in benzene-methanol 9:1 (about 10% of a by-product having an $Rf$ of 0.17).

(b) *Trityl-L-prolyl-L-tyrosyl-$N^\epsilon$-tert.-butyloxycarbonyl-L-lysine*.—21.5 grams (28 mmol) of trityl-L-prolyl-L-tyrosyl-$N^\epsilon$-tert.-butyloxycarbonyl-L-lysine methyl ester were suspended in 150 ml. of methanol, and at about 15° C. 45 ml. of a 2 N-solution of sodium hydroxide were added. Upon further stirring at room temperature the starting material dissolved. After 1 hour the solution was diluted with 100 ml. of water, it was freed from methanol in vacuo, the aqueous solution was covered with ethyl acetate at 0° C. while shaking, the mixture was acidified with an excess of 1 N-citric acid, and the ethyl acetate phase was separated, washed with 1 N citric acid and twice with water, then dried and evaporated in vacuo. The resulting thick foam was extracted twice with ether and triturated with petroleum ether to a powder. There were obtained 19.5 grams (93%) of an amorphous colorless product; in the thin layer chromatogram $Rf_{43}=0.53$ (also about 5% of H-Pro-Tyr-Lys(BOC)- $Rf_{43}=0.53$ (also about 5% of H-Pro--Tyr-Lys(BOC)-

(10) *Trityl-L-prolyl-L-tyrosyl-$N^\epsilon$-tert.-butyloxycarbonyl-L-lysyl-L-methionine methyl ester*. (a) *According to the azide method*.—762 mg. (1 mmol) of the crude trityl-L-prolyl-L-tyrosyl-$N^\epsilon$-tert.-butyloxycarbonyl-L-lysine hydrazide were converted into the azide by the method described under 8(a). The product precipitated with water was filtered off. It was dissolved in 40 ml. of ethyl acetate, and the solution was washed, while cooling with ice, with a 1 N-solution of sodium bicarbonate and with water, dried for a short time over magnesium sulfate and concentrated to about 10 ml. To the solution of the azide there were immediately added 205 mg. (1.25 mmol) of L-methionine methyl ester (freshly prepared from its hydrochloride and distilled, boiling at 58–60° C. under 0.02 mm. pressure), and the mixture was allowed to stand for 24 hours at 0° C., the product that separated as a jelly was pressed well on a cold suction filter, washed with a small amount of cold ethyl acetate, and crystallised from a large amount of ethyl acetate. There were obtained 340 mg. of felted needles melting at 172–174° C. The melting point did not change after repeated recrystallisation from methanol; $[\alpha]_D^{25}=-60.1°\pm0.5°$ (c.=2.0 in dimethylformamide); in the thin layer chromatogram $Rf_{43}=0.87$, $Rf=0.47$ in ethyl acetate, $Rf=0.19$ in benzene-methanol (9:1) (also traces of the methionine sulfoxide derivative having the $Rf$-values 0.80, 0.03 and 0.12 in the aforesaid systems).

(b) *According to the carbodiimide method*.—20 grams (about 26 mmol) of crude trityl-L-prolyl-L-tyrosyl-$N^\epsilon$-tert.-butyloxycarbonyl-L-lysine and 6 grams (37 mmol) of freshly distilled L-methionine methyl ester were dissolved in a mixture of 200 ml. of acetonitrile and 25 ml. of dimethylformamide, then mixed at −5° C. with 6.2 grams (30 mmol) of dicyclohexyl-carbodiimide, and the whole was stirred for 1 hour at −5° C. and for 20 hours at 0° C. The precipitated mixture of reaction product and dicyclohexylurea was filtered off, then stirred with 100 ml. of dimethylformamide, filtered to remove the undissolved dicyclohexylurea, and the filtrate was evaporated under 0.1 mm. pressure of mercury. The amorphous residue, after being dissolved in 100 ml. of warm ethyl acetate and slowly cooled, gave 9.6 grams (41%) of felted needles melting at 169–171° C. The original mother liquor, after the addition of 0.2 ml. of glacial acetic acid, was evaporated in vacuo. The residue was taken up in ethyl acetate, the solution was washed neutral in the usual manner, dried, and evaporated. The residue was extracted several times with ether, and then recrystallised from a little methanol. There were obtained 3.1 grams (13%) of a product melting at 170–172° C. After repeated recrystallisation of the combined crystalline fractions, there were obtained 10.1 grams (48%) of a product melting at 172–174° C. It had the same optical rotation and chromatographic purity in the thin layer chromatogram as the product prepared as described under (a) above.

(11) *L-prolyl - L-tyrosyl - $N^\epsilon$-tert.-butyloxycarbonyl-L-lysyl-L-methionine methyl ester.*—5.8 grams (6.5 mmol) of trityl-L-prolyl-L-tyrosyl-$N^\epsilon$-tert.-butyloxycarbonyl-L-lysyl-L-methionine methyl ester were suspended in 40 ml. of acetic acid of 75% strength, and agitated for 1 hour at room temperature. The peptide ester dissolved and at the same time trityl-carbonol separated out. After the addition of 20 ml. of water, the mixture was filtered, the filtrate was evaporated in vacuo, and the residue was dried under 0.1 mm. pressure of mercury and triturated repeatedly with ether. 4.42 grams of an amorphous powder (acetate) were obtained.

To convert the salt into the free ester the acetate so obtained was dissolved in 25 ml. of water, the solution covered with a large amount of ethyl acetate, and, while shaking, it was rendered alkaline at 0° C. with an excess of a 2 N-solution of potassium carbonate. The ethyl acetate phase was separated, the aqueous solution was extracted twice more with ethyl acetate, and the combined ethyl acetate extracts were washed with a small amount of a 1 N-solution of potassium carbonate and twice with a saturated solution of sodium chloride, dried for a short time, and concentrated in vacuo to about 100 ml. (when the separation of a solid product began). By the gradual addition of 200 ml. of ether the separation of the reaction product was completed. There were obtained 3.3 grams (78%) of a product melting at 177–180° C. In the thin layer chromatogram $Rf_{43}=0.52$, $Rf=0.32$ in the system chloroform - methanol (5:1) (traces of the methionine sulfoxide derivative having the $Rf$-values 0.36 and 0.12 in the said systems). After recrystallisation from acetonitrile the product was unitary in the thin layer chromatogram; melting point 181–183° C.; $[\alpha]_D^{25}=-19.2°$.

(12) *Tert. - butyloxycarbonyl-β-tert.-butyl-L-aspartyl-L-seryl - glycyl-L-prolyl-L-tyrosyl - $N^\epsilon$-tert.-butyloxycarbonyl-L-lysyl-L-methionine methyl ester.*—1.52 grams (3.5 mmol) of tert.-butyloxycarbonyl-β-tert.-butyl-L-aspartyl-L-seryl-glycine and 2.28 grams (3.5 mmol) of L-prolyl-L-tyrosyl - $N^\epsilon$-tert.-butyl - oxycarbonyl-L-lysyl-L-methionine methyl ester were dissolved in a mixture of 50 ml. of acetonitrile and 10 ml. of dimethylformamide, while stirring, and there was added to the solution at −10° C. 0.87 gram (0.2 mmol) of dicyclohexyl-carbodiimide. After further stirring under nitrogen for 1 hour at −10° C. and overnight at 0° C., the excess of dicyclohexyl-carbodiimide was decomposed by the addition of a few drops of glacial acetic acid. The precipitated dicyclohexyl-urea was filtered off, and the filtrate concentrated to a syrup under 0.1 mm. pressure of mercury. The residue was taken up in a large amount of ethyl acetate, the solution was washed, while cooling, with 1 N-hydrochloric acid, a 1 N-solution of sodium carbonate and a saturated solution of sodium chloride, then dried and evaporated in vacuo until the reaction product began to separate.

The solution (about 150 ml.) was heated to 40° C. and 600 ml. of ether were added while stirring. After 2 hours the product was isolated: 3.21 grams melting unsharply at 115–125° C.; after reprecipitation from ethyl acetate-ether: 3.13 grams (82%) melting at 123–130° C.; $[\alpha]_D^{25}=-48.3°\pm0.5°$ (c.=1.9 in methanol); in the thin layer chromatogram $Rf_{43}=0.86$, $Rf=0.75$ in the system chloroform-methanol (5:1) (traces of the methionine sulfoxide derivative having $Rf$-values 0.64 and 0.45 in the said systems).

(13) *Tert. - butyloxycarbonyl-β-tert-butyl-L-aspartyl-L-seryl - glycyl-L-prolyl-L-tyrosyl - $N^\epsilon$-tert.-butyloxycarbonyl-L-lysyl-L-methionine hydrazide.*—A solution of 3 grams (2.8 mmol) of tert.-butyloxycarbonyl-β-tert.-butyl-L-aspartyl-L-seryl - glycyl-L-prolyl-L-tyrosyl - $N^\epsilon$-tert.-butyloxycarbonyl-L-lysyl-L-methionine methyl ester in 7 ml. of methanol was mixed with 0.7 ml. (5 equivalents) of hydrazine hydrate and allowed to stand for 4 hours under nitrogen. The reaction product separated as a jelly, and was finely suspended with 40 ml. of ether, filtered off, washed with ether and then stirred twice with 40 ml. of water each time. After drying in vacuo at 30° C. there were obtained 2.47 grams melting at 178–183° C. In the thin layer chromatogram $Rf_{43}=0.77$, $Rf=0.32$ in chloroform-methanol (5:1); it also contained a small amount of starting material and about 10% of a by-product having $Rf$-values of 0.65 and 0.0 in the said systems. By recrystallisation from 100 ml. of water-methanol this by-product was completely separated. The resulting product (1.98 grams) after repeated recrystallisation from methanol-ether melted at 187–190° C.; $[\alpha]_D^{25}=-48.5°\pm0.5°$ (c.=1.9 in methanol).

(14) *β-Tert.-butyl-L-aspartic acid tert.-butyl ester.* (a) *Hydrochloride.*—In an autoclave 3.0 grams (22.5 mmol) of dried L-aspartic acid, 100 ml. dried chloroform and 3 ml. of concentrated sulfuric acid were mixed at −20° C. and the excess of isobutylene was distilled off with the exclusion of moisture. The solution that remained behind was diluted with a further 200 ml. of chloroform and then washed at 0° C. with a semi-saturated solution of potassium carbonate, dried with sodium sulfate and evaporated. The oily residue was dissolved in methanol and the quantity of hydrochloric acid calculated for forming the hydrochloride in methanol was added at −20° C. After evaporation, ether was added. There was obtained 4.5 grams (71%) of the hydrochloride of β-tert.-butyl-L-aspartic acid tert.-butylester as small rods melting at 152–155° C. For analysis the product was crystallised from acetone and acetone-ether. It melted at 156–158° C.; $[\alpha]_D^{26}=+6.6°\pm1.1°$ (c.=0.913 in methanol). In the paper chromatogram the hydrochloride exhibited only one spot; $Rf_{42}=0.87$; $Rf_{87}=0.85$. The free ester was obtained from the hydrochloride by means of ether-potassium carbonate in a yield of 90% of the theoretical yield.

(15) *$N^\alpha$ - carbobenzoxy - $N^\epsilon$ - tert. - butyloxycarbonyl-L-lysyl-L-aspartic acid di-tert.-butyl ester.*—7.81 grams (31.9 mmol) of β-tert.-butyl-L-aspartic acid tert.-butyl ester and 13.4 grams (35.2 mmol) of $N^\alpha$-carbobenzoxy $N^\epsilon$-tert.-butyloxycarbonyl-L-lysine were dissolved in 180 ml. of acetonitrile, and to the solution, cooled to −20° C., there were added 8.6 grams (41.8 mmol) of dicyclohexyl-carbodiimide. After allowing the mixture to stand for 30 minutes at −20° C. and for 3 days at 2° C. the precipitated dicyclohexyl-urea was filtered off with suction, and the filtrate was evaporated. The residue was taken up in ethyl acetate, and the solution was washed at 0° C., as usual with a solution of citric acid, water, a solution of sodium bicarbonate and water, then dried over sodium sulfate and evaporated. After separating the excess of dicyclohexyl-carbodiimide by means of petroleum ether, the residue was crystallised from ether-petroleum ether. The product was recrystallised from methanol-water and a total of 15.6 grams (81%) of the diester melting at 96–99° C. were obtained;

$$[\alpha]_D^{25}=-14.8°\pm0.5°$$

(c.=2.003 in methanol). In the thin layer chromatogram the compound exhibited one spot; $Rf=0.56$ in butyl acetate; $Rf=0.74$ in ethyl acetate; $Rf=0.81$ in chloroform-methanol (19:1).

(16) *$N^\epsilon$ - tert. - butyloxycarbonyl - L - lysyl-L-aspartic acid di-tert.-butyl ester.*—A solution of 17.2 grams (28.3 mmol) of $N^\alpha$-carbobenzoxy-$N^\epsilon$-tert.-butyloxycarbonyl-L-lysyl-L-aspartic acid di-tert.-butyl ester in 250 ml. of ethanol was hydrogenated in the presence of 1.0 gram of palladium on carbon (10% Pd). The carbon dioxide formed during the hydrogenation was collected in a second hydrogenation vessel charged with sodium hydroxide solution. After 50 minutes when 630 ml. of hydrogen had been absorbed the hydrogenation ceased. The catalyst was filtered off and the filtrate was evaporated. There were obtained 12.7 grams (95% theory) of a colorless resin, which was immediately worked up.

(17) *Carbobenzoxy - L - prolyl - tert. - butyloxycarbonyl-L-lysyl-L-aspartic acid di-tert.-butyl ester.*—A solution of 12.5 grams (26.4 mmol) of $N^\epsilon$-tert.-butyloxycarbonyl-L-lysyl-L-aspartic acid di-tert.-butyl ester and 7.23 grams (29.1 mmol) of carbobenzoxy-L-proline in 100 ml. of acetonitrile was mixed at $-20°$ C. with 6.53 grams (31.7 mmol) of dicyclohexyl-carbodiimide, and then allowed to stand for 30 minutes at $-20°$ C. and for 38 hours at $2°$ C. After filtering off the dicyclohexyl-urea the filtrate was evaporated and the residue was taken up in ethyl acetate, the solution was as usual washed, dried and evaporated. The residue was triturated several times with petroleum ether and then with ether, and the insoluble portion was reprecipitated from ethyl acetate-ether. In this manner a total of 13.33 grams (72% of theory) of pure carbobenzoxy-L-prolyl-tert.-butyloxycarbonyl-L-lysyl-L-aspartic acid di-tert.-butyl ester was obtained as a solid powder melting at 103–105° C. For analysis the product was crystallised from tert.-butanol-water. It melted at 104–105° C; $[\alpha]_D^{30} = -43.6° \pm 0.6°$ (c.=1.738 in ethanol). The product exhibited one spot in the thin layer chromatogram; $Rf=0.46$ in ethyl acetate; $Rf=0.64$ in benzene-acetone (1:1); $Rf=0.78$ in chloroform-methanol (19:1).

(18) *L - prolyl - tert. - butyloxycarbonyl - L - lysyl-L-aspartic acid di-tert.-butyl ester.*—12.0 grams (17.0 mmol) of carbobenzoxy-L-prolyl-tert.-butyloxycarbonyl-L-lysyl-L-aspartic acid di-tert.-butyl ester were dissolved in 700 ml. of ethanol, and hydrogenated in the presence of 1 gram of palladium-carbon (10% Pd) as described under (16) above ($H_2$-absorption: 377 ml. in the course of 5 hours). Working up in an analogous manner gave 9.10 grams (94% of theory) of L-prolyl-tert.-butyloxycarbonyl-L-lysyl-L-aspartic acid di-tert.-butyl ester as a colorless resin, which was immediately further worked up.

(19) *Carbobenzoxy - L - prolyl - L - prolyl - tert.-butyloxycarbonyl-L-lysyl-L-aspartic acid di - tert. - butyl ester.*—9.10 grams (16.0 mmol) of L-prolyl-tert.-butyl-oxycarbonyl-L-lysyl-L-aspartic acid di-tert.-butyl ester and 4.40 grams (17.7 mmol) of carbobenzoxy-L-proline were dissolved in 80 ml. of acetonitrile, and to the solution were added at $-20°$ C. 4.0 grams (19.4 mmol) of dicyclohexyl-carbodiimide. After standing for 1 hour at $-20°$ C. and for 3 days at $2°$ C., the precipitated dicyclohexyl-urea was filtered off with suction, the filtrate was evaporated and the residue was taken up in ethyl acetate. The solution was washed neutral in the usual manner and evaporated. To separate the excess of dicyclohexyl-carbodiimide the residue was triturated with petroleum ether, the insoluble portion (12.81 grams) was dissolved in benzene-chloroform (1:1), and the solution was introduced into a column of 600 grams of silica gel "Mesh 200" (Davison). The tetrapeptide derivative was eluted with benzene-chloroform (1:4) and (1:9). For recrystallisation a small amount of petroleum ether was added to these fractions, and the whole was allowed to stand for several days at 35–40° C., whereby the undissolved, initially amorphous material slowly crystallised throughout. After pouring off the petroleum ether solutions, 9.20 grams (72% of theory) of carbobenzoxy-L-prolyl-L-prolyl-tert.-butyloxycarbonyl-L-lysyl-L-aspartic acid di-tert.-butyl ester melting at 77–84° C. were obtained. For analysis the product was recrystallised twice from ether. It melted at 78–85° C.; $[\alpha]_D^{25} = -72.9° \pm 0.5°$ (c.=2.026 in ethanol). In the thin layer chromatogram the compound exhibited one spot, $Rf=0.17$ in ethyl acetate; $Rf=0.47$ in benzene-acetone (1:1); $Rf=0.82$ in dioxane-water (9:1).

(20) *L - prolyl-L-prolyl-tert.-butyloxycarbonyl-L-lysyl-L-aspartic acid di-tert.-butyl ester.*—A solution of 7.06 grams (8.80 mmol) of carbobenzoxy-L-propyl-L-prolyl-tert.-butyl ester in 100 ml. of methanol was hydrogenated as described under (16) above ($H_2$-absorption: 185 ml. in 90 minutes) and worked up in an analogous manner. From ether there were obtained 3.65 grams of crystalline L - prolyl - L-prolyl-tert.-butyl-oxycarbonyl-L-lysyl-L-aspartic acid di-tert.-butyl ester as needles melting at 146–149° C. From the mother liquor, after being concentrated, there were obtained a further 1.54 grams having the same melting point (total yield 88% of theory). For analysis the product was recrystallised from methanol-ether. It then melted at 147–149° C.

$$[\alpha]_D^{25} = -73.1° \pm 0.7°$$

(c.=1.381 in methanol). In the thin layer chromatogram the compound exhibited one spot; $Rf=0.12$ in dioxane-water (9:1); $Rf=0.18$ in methanol.

(21) *Carbobenzoxy - L - seryl-L-prolyl-L-prolyl-tert.-butyloxycarbonyl - L-lysyl - L-aspartic acid di-tert.-butyl ester.*—A solution, cooled to $-20°$ C., of 5.18 grams (7.75 mmol) of L-prolyl-L-prolyl-tert.-butyloxycarbonyl-L-lysyl-L-aspartic acid di-tert.-butyl ester and 2.22 grams (9.30 mmol) of carbobenzoxy-L-serine in 60 ml. acetonitrile was mixed with 2.88 grams (14.0 mmol) of dicyclohexylcarbodiimide, and the whole was allowed to stand for 65 hours at $2°$ C. The product was then worked up as described under (19) above. The residue remaining after evaporating the ethyl acetate (7.75 grams) was triturated with petroleum ether to remove the excess of dicyclohexyl-carbodiimide, the insoluble portion (7.40 grams) was dissolved in benzene-chloroform (1:4) and introduced into a column of 350 grams of silica gel "Mesh 200." After eluting small amounts of by-products with benzene-chloroform (1:9), chloroform and chloroform-methanol (99:1), the carbobenzoxy-L-seryl-L-prolyl - L-prolyl-tert.-butyl-oxycarbonyl-L-lysyl-L-aspartic acid di-tert.-butyl ester was eluted with chloroform-methanol (98:2). There were obtained 5.36 grams (78% of theory) of a resin which was unitary according to the thin layer chromatogram. Reprecipitation twice from ether-petroleum ether gave an analytically pure amorphous product; $[\alpha]_D^{25} = -96.6° \pm 0.7°$ (c.=1.397 in methanol). $Rf=0.22$ in chloroform-methanol (19:1), $Rf=0.62$ in dioxane; $Rf=0.66$ in chloroform-methanol (9:1).

(22) *L - seryl - L - prolyl - L-prolyl-tert.-butyloxy-carbonyl-L-lysyl-L-aspartic acid di-tert.-butyl ester.*—1.778 grams of carbobenzoxy-L-seryl-L-prolyl-L-prolyl-tert.-butyloxycarbonyl-L-lysyl-L-aspartic acid di-tert.-butyl ester were dissolved in 25 ml. of methanol and hydrogenated in the presence of 200 mg. of palladium on charcoal (10% Pd). The absorption of hydrogen ceased after 1 hour, and, after further stirring for 1 hour, the catalyst was filtered off, and the solution was concentrated to a small volume. By the addition of ethyl acetate and petroleum ether, the peptide was precipitated as a semi-solid mass, and the supernatant solution was decanted off and discarded. Upon drying in a high vacuum at 40° C. 1.483 grams (98%) of chromatographically pure H - Ser - Pro - Pro-Lys(BOC)-Asp(OtBu)-OtBu melting unsharply at about 80–90° C. were obtained;

$$[\alpha]_D = -92° \pm 0.5°$$

(c.=2.0 in methanol). Thin layer chromatogram: $Rf_{52}=0.26$; $Rf_{101}=0.71$.

(23) *Carbobenzoxy - $\gamma$ - tert.-butyl-L-glutamyl-histidyl-L - phenylalanyl - L-arginyl -L-tryptophyl-glycyl-L-seryl-L - prolyl - L-prolyl-tert.-butyloxycarbonyl-L-lysyl-aspartic acid di-tert.-butyl ester acetate.*—1.271 grams (1.25 mmol) of carbobenzoxy - $\gamma$ - tert. - butyl - L - glutamyl - L-histidyl-L-phenylalanyl-L-arginyl-L-tryptophyl-glycine and 0.237 gram (1.25 mmol) of p-toluene sulfonic acid, $H_2O$ were dissolved while heating to 50° C. in 3.5 ml. of absolute dimethylformamide, the solution was cooled to 20° C., and a solution of 0.89 gram (1.18 mol) of L - seryl - L-prolyl-L-prolyl-tert.-butyloxycarbonyl-L-lysyl-L-aspartic acid di-tert-butyl ester in 3.5 ml. of chloroform was added. Then 0.315 gram (1.53 mmol) of dicyclohexyl-carbodiimide in solid form was added, and the mixture was stirred overnight at 22° C. and for a further 8 hours at 40° C. after cooling the whole to 0° C., the separated dicyclohexyl-urea was filtered off, the filtrate was concentrated under the reduced pressure of a water jet pump at 40° C. as far as possible, and the reaction product was precipitated by adding 35 ml. of benzene and 35 ml. of petroleum ether as a viscous mass. It was again dissolved in 4 ml. of methanol, precipitated as a finely pulverulent precipitate by adding 40 ml. of ether, filtered off, and dried in a high vacuum at 40° C. The crude product so obtained (2.26 grams, tosylate) was converted into the acetate by dissolving it in 32 ml. of methanol and 16 ml. of water, and filtering the solution through a column of a weakly basic ion exchanger (Merck No. II) in the acetate form (length of column 15 cm.; diameter 2 cm.; solvent used methanol-water (1:1)). The eluate was concentrated to 50 ml. and then lyophilised. There were obtained 2.08 grams of acetate, which was purified by multiplicative distribution over 230 stage in the system methanol-0.1-molar ammonium acetate (pH 7)-chloroform-carbon tetrachloride (2:1:1:1)

with phase volumes of 25 ml. each. The contents of the partition elements Nos. 56–85 (maximum at No. 68; K=0.42) gave upon evaporation to dryness a total of 1.22 grams of the protected undecapeptide acetate (57%, calculated on the pentapeptide used). By chromatography the product contained about 5% of an impurity and was further processed in this condition. By thin layer chromatography: $Rf_{52}=0.29$; $Rf_{101}=0.81$.

(24) γ - Tert. - butyl - L - glutamyl - L - histidyl - L-phenylalanyl - L - arginyl - L - tryptophyl - glycyl - L-seryl - L - prolyl - L - prolyl - tert. - butyloxycarbonyl-L - lysyl - L - aspartic acid di - tert. - butyl ester acetate.— 1.21 grams of the carbobenzoxy-undecapeptide ester were hydrogenated in 30 ml. of methanol in the presence of 0.04 ml. of glacial acetic acid and 300 ml. of palladium on charcoal (10% Pd) at 30° C. under atmospheric pressure in a small flask having a magnetic stirrer without absorption of the carbon dioxide formed. The progress of the reaction was followed by testing samples by thin layer chromatography. After 4 hours the splitting off of the carbobenzoxy-group was terminated, and the solution was evaporated to dryness after filtering off the catalyst, the amorphous residue was pulverised and dried at 40° C. in a high vacuum. There were obtained 1.076 grams (96%) of the undecapeptide ester acetate, which had chromatographic purity of about 95%. Thin layer chromatography: $Rf_{52}=0.12$; $Rf_{101}=0.67$.

(25) $N^\alpha$ - tert. - butyloxycarbonyl - β - tert. - butyl - L-aspartyl - L - seryl - glycyl - L - prolyl - L - tyrosyl - tert.-butyloxycarbonyl - L - lysyl - L - methionyl - γ - tert.-butyl - L - glutamyl - L - histidyl - L - phenylalanyl - L-arginyl - L - tryptophyl - glycyl - L - seryl - L - prolyl-L - prolyl - tert. - butyloxycarbonyl - L - lysyl - L-aspartic acid di-tert.-butyl ester acetate.—814 mg. (0.763 mmol) of $N^\alpha$ - tert. - butyloxycarbonyl - β - tert. - butyl-L - aspartyl - L - seryl - glycyl - L - prolyl - L - tyrosyl-tert. - butyloxycarbonyl - L - lysyl - L - methionine hydrazide were dissolved in 8 ml. of absolute dimethylformamide, and in an ice-sodium chloride bath (−12° C.) 3.05 ml. of 1 N-hydrochloric acid and 0.632 ml. of a sodium nitrite solution of 10% strength (0.916 mmol) were added. The clear solution was allowed to stand for 5 minutes at −12° C., and then the resulting azide was precipitated in the form of a flocculent precipitate by adding 38 ml. of pre-cooled sodium chloride solution of 20% strength. The precipitate was filtered off at 0° C., washed on the suction filter with 10 ml. of ice-cold sodium bicarbonate solution of 5% strength and finally with 4 ml. of water, then dissolved while still moist, in 16 ml. of dimethylformamide at 0° C., and mixed with a solution of 1.07 grams (0.635 mmol) of γ - tert. - butyl - L-glutamyl - L - histidyl - L - phenylalanyl - L - arginyl - L-tryptophyl - glycyl - L - seryl - L - prolyl - L - prolyl-tert. - butyloxycarbonyl - L - lysyl - L - aspartic acid di-tert.-butyl ester acetate in 10 ml. of dimethylformamide. The clear solution was kept for 18 hours at 0°, then evacuated under a water jet vacuum for 18 hours at 0°, then evacuated under a water jet vacuum for 15 minutes at 20° C. (removal of $HN_3$) and allowed to stand for a further 23 hours at 20° C. The greater part of the dimethylformamide was then evaporated under a high vacuum at 40° C., the honey-like residue was dissolved in 60 ml. of hot benzene, and precipitated as a powder by adding 60 ml. of petroleum ether, filtered off, and dried. The resulting 1.88 grams were pre-purified by dissolution of 48 ml. of ethyl acetate and 80 ml. of petroleum ether. There were obtained 1.63 grams of crude product, which was further purified by multiplicative distribution over 500 stages in the system methanol-0.1-molar ammonium acetate (pH 7)-chloroform-carbon tetrachloride (17:7: 8:8) with phase volumes of 25 ml. each. From the partition elements Nos. 110–149 (maximum at No. 130; K=0.35) there were obtained by evaporation to dryness 952 mg. of protected β-MSH-acetate (55% calculated on the undecapeptide used) as a white powder melting at about 220–225° C. (with decomposition). From the thin layer chromatogram in the system 52 the presence of about 10% of a by-product having a lower Rƒ-value was apparent. (Maximum for the by-product about No. 140; K ca. 0.39.) The optical rotation of the protected β-MSH acetate was $[\alpha]_D = -36° \pm 1°$ (c.=1.06 in methanol).

$C_{129}H_{196}O_{36}N_{26}S$ (acetate; 2719.1).

Calc.: C, 56.98; H, 7.27; O, 21.18; N, 13.39; S, 1.18, acetic acid 2.21%.

Found: C, 56.53; H, 7.55; O, 20.84; N, 13.10; S, 1.28, acetic acid 2.1%.

UV-absorption in methanol-1 N-sodium hydroxide solution (9:1): $\gamma_{max}$: 283 mμ (=7550); 289 mμ (=7400) Try: Tyr=1.05.

Thin layer chromatography: $Rf_{43}=0.56$; $Rf_{52}=0.45$.

By product: $Rf_{43}=0.56$; $Rf_{52}=0.39$.

(26) L - aspartyl - L - seryl - glycyl - L - prolyl - L-tyrosyl - L - lysyl - L - methionyl - L - glutamyl - L-histidyl - L - phenylalanyl - L - arginyl - L - tryptophyl-glycyl - L - seryl - L - prolyl - L - prolyl - L - lysyl - L-aspartic acid.—440 mg. of protected β-MSH acetate were dissolved in 8.8 ml. of trifluoroacetic acid of 97% strength and allowed to stand for 1 hour at 20° C. in the dark. The solution was then cautiously concentrated to a small volume, and, after the addition of 4 ml. of water, again concentrated, and then lyophilised. There were obtained 565 mg. of the trifluoracetate, which was then dissolved in water and converted into the acetate (389 mg.) by filtration through a column (1=15 cm., φ=0.9 cm.) of a weakly basic ion exchanger (Merck No. II) in the form of the acetate. In chromatography (thin layer chromatogram, system 104) the values were as follows:

| | |
|---|---|
| $Rf=0.07$ | Traces. |
| $Rf=0.18$ | Traces. |
| $Rf=0.26$ | About 10% (by-product). |
| $Rf=0.31$ | About 85–90% (β-MSH). |
| $Rf=0.52$ | Traces. |

This mixture was purified by multiplicative distribution by the method of Craig in the system 0.5% trichloracetic acid-secondary butanol in an atmosphere of nitrogen. The phase volumes of the upper and lower phases were each 10 ml. After 1300 stages the maximum was at partion element No. 468 (K=0.56). In the region of the maximum the solution was withdrawn in fractions each of 5 partition units, then cautiously concentrated to a small volume in vacuo, and lyophilised. This layer chromatography (system 104) showed the sample from the partition elements Nos. 453–487 to be completely free from the by-product having an $Rf=0.26$. The by-product was present mainly in elements Nos. 408–432, in mixed fractions together with β-MSH. (Maximum for the by-product at about No. 16, $r_{max}=416$, $K=0.47$.) However, all the fractions showed, as did the crude product used, traces of impurities having an $Rf=0.07$ and 0.18 (sulfoxide), which were apparently freshly formed during the distribution or during the working up. The fractions from the partition elements Nos. 453–487 were combined (trichloroacetate) and again converted into the acetate by means of a weakly basic ion exchanger. For final purification the acetate was chromatographed over a column of a weakly acid ion exchanger based on dextran-gel (carboxymethyl-Sephadex C–25, medium grade, Pharmacia, Uppsala) as follows:

The column ($l=17.5$ cm.; $\phi=0.96$ cm.) was first equilibrated with an 0.05-molar ammonium acetate buffer (pH=5.5), and, after introducing the product dissolved in 0.5 ml. of water, washed with a further 30 ml. of 0.05-molar buffer solution (eluate discarded). Then a linearly increasing concentration gradient was established, produced by mixing the contents of two open cylindrical vessels each containing 80 ml. of an 0.05-molar and 0.6-molar ammonium acetate buffer respectively of pH 5.5. The optical density of the eluate was recorded continuously by means of a "Uvicord" apparatus (LKB Produkter A.B., Stockholm). The several fractions were concentrated to a small volume, lyophilised and examined chromatographically:

| Fraction No. | Volume, ml. | Buffer concentration | Weight, mg. | Evaluation (thin layer, system 104) |
|---|---|---|---|---|
| 1 | 51 | 0.05–0.22 | Traces | |
| 2 | 9 | 0.22–0.25 | 4.5 | β-MSH (about 40% and sulfoxide about 50%). |
| 3 | 15 | 0.25–0.30 | 96 | β-MSH with about 1–2% sulfoxide. |
| 4 | 9 | 0.30–0.33 | 94 | Pure β-MSH. |
| 5 | 8 | 0.33–0.36 | 6 | β-MSH (about 20% and by-product $Rf=0.07$ about 80%). |
| 6 | 9 | 0.36–0.39 | 4.5 | By-product, $Rf=0.07$. |
| 7 | 18 | 0.39–0.45 | 5 | |
| 8 | 16 | 0.45–0.51 | 2 | |

From fraction 3 the sulfoxide could be removed by repeated chromatography over carboxymethyl-Sephadex C25. The pure β-MSH acetate obtained from fraction 4, after drying over potassium hydroxide for 15 hours at 50° C. under 0.01 mm. pressure of mercury, still contained a few percent of water, and was strongly hygroscopic. On standing in the air it took up 7.1% of moisture (equilibrium state). Such a sample had the following analytical values: UV-absorption in an 0.1 N-solution of sodium hydroxide: 2.134 mg. of product dissolved in 10 ml. (molecular weight=2134) $D_{294.4}=^{0.380\_0.011}$ (basic absorption)=0.369 $D_{280}=0.582-0.013$ (basic absorption)=0.569. Obtained therefrom by calculation (G. H. Beavan and E. R. Holiday, Advances in Protein Chemistry, 7, 319 [1952]):

$M_{Try}+M_{Tyr}=1.56 \cdot 10^{-4}$ mol./l.
$M_{Try}/M_{Tyr}=1.27$
Peptide content=$1.56 \cdot 100=78\%$ Determination of acetic acid by distillation with sulfuric acid and titration with sodium hydroxide solution: Found 6.5%. Optical activity: $[\alpha]_D=-57.5°\pm1°$ (c.=0.99 in 1 N-acetic acid).

Determination of amino-acids in the total hydrolysate, 16 hours at 110° C. in hydrochloric acid of 20% strength (the theoretical values given in parentheses):

His(1) 1.07, Lys(2) 1.98, Arg(1) 0.96, Asp(2) 2.07, Ser(2) 1.83, Glu(1) 0.97, Pro(3) 3.20, Gly(2) 2.03, Met(1) 0.91, Tyr(1) 1.05, Phe(1) 1.00.

Thin layer chromatography on silica gel: $Rf_{101}=0.23$; $Rf_{104}=0.31$.

Paper electrophoresis on Whatman paper No. 1:

pH2 (formic acid-acetic acid) 50 v./cm., 1 hour-11 cm.
pH 6.3 (pyridine acetate) 75 v./cm., 2 hours-4.9 cm.

What is claimed is:
1. L-seryl-L-prolyl-L-prolyl-tertiary butyloxycarbonyl-L-lysyl-L-aspartic acid di-tertiary butyl ester.
2. γ-Tertiary butyl-L - glutamyl-L - histidyl-L-phenylalanyl-L-arginyl-L-tryptophyl-glycyl - L-seryl-L-prolyl-L-prolyl-tertiary butyloxycarbonyl-L-lysyl-L-aspartic acid-di-tertiary butyl ester.
3. Tertiary butyloxycarbonyl-β-tertiary butyl-L-asparagyl-L-seryl-glycyl-L-prolyl-L-tyrosyl-tertiary butyloxycarbonyl-L-lysyl-L-methionine hydrazide.
4. Tertiary butyloxycarbonyl-β-tertiary butyl-L-asparagyl-L-seryl-glycyl-L-prolyl-L-tyrosyl-tertiary butyloxycarbonyl-L-lysyl-L-methionine-γ-tertiary butyl-L-glutamyl-L-histidyl-L-phenylalanyl-L-arginyl - L-tryptophyl-glycyl-L-seryl-L-prolyl-L-prolyl-tertiary butyloxycarbonyl-L-lysyl-L-aspartic acid di-tertiary butyl ester.

References Cited by the Examiner

UNITED STATES PATENTS

| | | | |
|---|---|---|---|
| 2,524,422 | 10/1950 | Boothe et al. | 260—112.5 |
| 2,917,502 | 12/1959 | Schwyzer et al. | 260—112.5 |
| 3,014,023 | 12/1961 | Schwyzer et al. | 260—112.5 |

LEWIS GOTTS, *Primary Examiner.*

ELBERT L. ROBERTS, *Examiner.*

P. A. STITH, *Assistant Examiner.*